UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

METHOD OF MOLDING OBJECTS HAVING A REFRACTORY SURFACE LAYER.

1,094,828.   Specification of Letters Patent.   Patented Apr. 28, 1914.

No Drawing.   Application filed August 26, 1910.   Serial No. 579,129.

*To all whom it may concern:*

Be it known that I, JONAS W. AYLSWORTH, a citizen of the United States, and a resident of East Orange, Essex county, New Jersey, have invented a certain new and useful Method of Molding Objects Having a Refractory Surface Layer, of which the following is a description.

My invention relates to a process of molding objects formed of a hard phenolic condensation product or of other materials and surfaced with a layer or veneer of a refractory phenolic condensation product.

The object of the invention is the production of a coating or surface on molded objects of superior character to the surface which would otherwise result by molding the particular substance alone.

Other objects of my invention will be evident from a perusal of the following specification and appended claims.

My invention contemplates the production of articles of any desired color or combination of colors from a stock of inferior color, such as the production of white billiard balls from a dark indefinite colored mass, the desired white being imparted to the ball by the surface layer.

Disk and cylindrical sound records having a homogeneous surface and a non-homogeneous interior may be formed by my invention. I also contemplate forming various colored veneers on embossed or plain articles of furniture. Colored designs or pictures in a variety of colors may be formed on objects, or letters or figures molded in the object by my invention.

Other objects of my invention will appear hereinafter.

My invention comprises the formation of surfaces of a refractory phenolic condensation product on objects, carried out either in one operation or a series of operations, whereby the enamel is molded onto the article and forms a fascimile of the mold surface.

In practising the invention, a suitable mold is painted with or dipped in a solution of a fusible phenolic condensation product mixed with a hardening agent therefor, that is, a substance containing the methylene radical $CH_2$ in proper proportion to react with the fusible product upon application of heat to form an infusible insoluble hard final condensation product. Or the solution may contain the elements from which the fusible soluble phenolic condensation product results by heating, namely, phenol and formaldehyde or their equivalents. The solvent used may be a volatile solvent such as amyl alcohol, or a solid solvent may be used, which dissolves the fusible condensation resin in fused state, that is, a substance which remains in the final condensation product when the latter is formed either in solid solution or as an emulsion. The fusible soluble phenolic condensation product I refer to is preferably that described in my Patent No. 1,029,737, dated June 18, 1912, entitled Fusible phenol resin and method of forming same, and in my Patent No. 1,020,593, dated March 19, 1912, entitled Phenolic condensation product and method of preparing same, or various of the so-called shellac substitutes of phenolic or creosolic origin may be substituted for the soluble condensation product or phenol resin above referred to. If a volatile solvent is used, it should be one whose boiling point is higher than the temperature at which the final hardening reaction of the elements in solution into an infusible insoluble product is intended to be performed, that is, something above 200 degrees F. The substance with which the mold is coated may be the enamel lacquer or varnish described and claimed in my application Serial No. 543,239, filed February 11, 1910. If a solid solvent is used in place of the volatile solvent, one should be chosen which may be thin enough when containing the elements in solution to properly coat the mold. Such solid solvents as mono-nito-naphthalene, oil of mirbane, camphor oil, di-nitro-benzol, acetanilid, phthalic anhydrid, anhydrous phenol, and others may be used. If free phenol is used as the solid solvent, an excess of hexa-methylene-tetra-amin or other methylene-containing hardening agent used must be added to react with the free phenol during the final hardening reaction to cause all of the phenol to be taken into the combination to form the final refractory product.

When a transparent or homogeneous enamel is desired, pigments are not added, but if a colored surface is desired, an inert pigment is mixed with the varnish and the surface of the mold coated as desired. After coating the mold with the enamel, it is allowed to dry, if a volatile solvent is used in the enamel, and then is heated to cause the ingredients of the enamel to react and harden and form the final infusible condensation product referred to. After this transformation of the composition in the mold, the latter is filled with the substance to be surfaced, which is compressed in the mold, and heat applied to the substance and the mold to cause the surface layer and the substance pressed into contact therewith to become firmly welded together. The molded object is then cooled and removed from the mold, the surface layer or veneer having been transferred from the mold surface to the object.

I am aware that it has been proposed to dust a mold with a powdered partial reaction condensation product for the purpose of supplying a finished surface to an otherwise more or less porous backing, and that it is old to varnish, lacquer, paint, dip, or otherwise coat an object after molding for the purpose of adding finish, luster and color to the same, and also that it is not new to veneer an article by pressing and welding thereto thin sheets previously made.

These methods all have their limitations. In the first case, in which a mold is dusted with a powdered partial reaction condensation product, the dusted material cannot always be spread uniformly over the surface of the mold, especially when the latter is of irregular form, and when the mass is pressed therein the flowing under pressure disturbs the surface powder and makes a non-uniform surface. Also, if the powder dusted on the mold surface is fusible and has not been hardened before pressing the object to be surfaced into contact therewith, the mass pressed into the mold, especially if the same consists of a refractory phenolic condensation product, will be relatively harder than the powder and will sink through the same in places, rendering the final product non-uniform.

In my method, the mold may be coated uniformly with fairly thick or with extremely thin veneers which are hardened by heat before filling the mold with the mass, which when pressed in the mold, will not disturb the same. Also, a mass which is not readily extracted from the mold because of its tendency to stick thereto may successfully be molded by the process described, and the articles produced with perfectly uniform veneers of great variety on regular or extremely irregular forms.

A great variety of products may economically and efficiently be produced by this method, such as buttons, toilet articles, ornamental objects, tools and instrument handles, parts of jewelry, toys, and tiling. Book covers, ornamental lumber, and wall covers may be produced with any desired shade of color, or with colored design, if desired. Paper dishes may be surfaced in the manner described with the refractory phenolic condensation product and ornamental designs similar to those used upon china dishes may be made thereon by stamping the design upon the coating in the mold before pressing the paper dish therein, or by stamping the design upon the paper before pressing in the mold. Mother-of-pearl surfaces may be made by coating the mold with transparent lacquers and dusting powdered or granulated pearl shell on the same while the lacquer or varnish is still sticky, or by painting the mold with a mixture of powdered pearl shell and the phenolic lacquer solution. White surfaces are obtained by using a solution of the phenolic lacquer described, for which purpose the following ingredients and proportions have been found to be well adapted: Powdered phenol resin, that is, the fusible soluble final condensation product referred to in my Patents Nos. 1,029,737 and 1,020,593 above referred to—100 parts; tri-oxy-methylene—7 to 10 parts; a solid fatty acid, as stearic acid—5 to 10 parts; barium sulfate, or other white pigment, 50 to 300 parts; amyl alcohol being used as a solvent.

Pictures, photographs, and colored designs may be indelibly molded on the surfaces of objects by first coating the mold with a transparent film of the phenolic lacquer described, applying the design or picture to the coating when formed, and hardening and protecting the same by a final coating of the lacquer for background before pressing or molding the article to be surfaced thereby. Articles may be molded of materials which of themselves will not stick to the hardened veneer, by applying the veneer in two or more coats, and leaving the last coat dry but unhardened by heat before pressing the mass or article in or on the mold or matrix.

For producing a surface on sound records, I prefer to coat the mold with a solution of either a suitable partial reaction product of phenol and formaldehyde capable of being rendered infusible and insoluble by heat, or with a solution of a mixture of a soluble fusible complete phenolic reaction product, such as is described as phenol resin in my Patent No. 1,029,737 referred to, and a hardening agent therefor, such as tri-oxy-methylene or hexamethylene-tetra-amin in the solvent which will not boil at the hardening temperature. A plasticity agent, such as described in my patent above referred to, or my application 496,060, filed May 14, 1909 should also be used, unless this element is present, as when used as a solvent which remains in the mass when hardened. This process permits of rapid molding, as the mold may be heated rapidly without causing blisters or bubbles. For the purpose of rapid molding I have found that the hardening transformation of the phenolic product may be accelerated by adding small percentages of chloro-toluene, chlorid of anilin, stearic anhydrid, or chloro-naphthalene.

Having now described my invention, what I claim and desire to protect by Letters Patent is as follows:—

1. The method of molding articles, which consists in coating a mold with a solution of substances which react upon application of heat to form a hard phenolic condensation product which is infusible and insoluble but somewhat plastic when heated, drying the same, heating to cause the ingredients to react as aforesaid, pressing a substance to be surfaced into contact with the mold thus coated, while applying heat sufficient to cause the substance to become firmly welded to the coating in the mold, cooling, and removing from the mold the molded article with the hard coating adhering thereto, substantially as described.

2. The method of molding articles, which consists in coating a mold with a solution comprising a methylene-containing substance, a soluble phenolic condensation product capable of reacting with said substance, on application of heat, to form a hard insoluble product, and a plasticity agent dissolved therewith, heating to cause the ingredients to react and form a hard insoluble product, pressing a substance to be surfaced into contact with the mold thus coated, while applying heat sufficient to cause the substance to become firmly welded to the coating in the mold, cooling, and removing from the mold the molded article with the hard coating adhering thereto, substantially as described.

3. The method of molding articles, which consists in coating a mold with a solution of substances which react upon application of heat to form a hard phenolic condensation product which is infusible and insoluble but somewhat plastic when heated, drying the same, heating to cause the ingredients to react as aforesaid, pressing an article to be surfaced, said article being formed of an infusible hard phenolic condensation product, into contact with the mold thus coated, while applying heat sufficient to cause the article to become firmly welded to the coating in the mold, cooling, and removing from the mold the molded article with the hard coating adhering thereto, substantially as described.

4. The method of molding articles, which consists in coating a mold with a solution of substances capable of transformation on application of heat into a hard final insoluble phenolic condensation product, in a solvent having a boiling point higher than the temperature at which the hardening transformation is to be carried out, causing the final hardening transformation with application of heat, and pressing a substance to be surfaced into contact with the mold thus coated, while applying heat sufficient to cause the substance to become firmly welded to the coating in the mold, substantially as described.

5. The method of molding articles, which consists in coating a mold with a solution of a soluble and fusible complete phenolic condensation product mixed with a methylene-containing hardening agent therefor, in a solvent having a boiling point higher than the temperature at which the hardening transformation is to be carried out, causing the final hardening transformation with application of heat, pressing a substance to be surfaced into contact with the coating thus formed in the mold while applying heat sufficient to cause the substance to become firmly welded to the coating in the mold, and removing from the mold the molded article thus coated substantially as described.

6. The method of molding articles, which consists in coating a mold with a solution of substances which react upon application of heat to form a hard phenolic condensation product which is infusible and insoluble but somewhat plastic when heated, drying the same, heating to cause the ingredients to react as aforesaid, said coating being transparent or translucent, applying a design or picture thereto, pressing a substance sign or picture thereto, pressing a substance to be surfaced into contact with the mold thus coated, while applying heat sufficient to cause the substances to become firmly welded to the coating with the design applied thereto in the mold, cooling, and removing from the mold the molded article with the coating adhering thereto, substantially as described.

7. The method of molding articles, which consists in forming a transparent coating of a final hard phenolic condensation product upon the surface of a mold, applying a design or picture thereto, forming a protective coating of a final hard phenolic condensation product upon said design, and pressing with application of heat an article to be surfaced into contact with the mold thus coated, substantially as described.

This specification signed and witnessed this 19th day of August 1910.

JONAS W. AYLSWORTH.

Witnesses:
Dyer Smith,
H. H. Dyke.

It is hereby certified that in Letters Patent No. 1,094,828, granted April 28, 1914, upon the application of Jonas W. Aylsworth, of East Orange, New Jersey, for an improvement in "Methods of Molding Objects Having a Refractory Surface Layer," errors appear in the printed specification requiring correction as follows: Page 1, line 45, for the word "fascimile" read *facsimile;* same page, line 93, for the compound word "mono-nito-naphthalene" read *mono-nitro-naphthalene;* page 3, strike out line 102; same page, line 105 as now numbered, for the word "substances" read *substance;* and that the said Letters Patent should be read with these corrections therein that the same may conform to the record of the case in the Patent Office.

Signed and sealed this 26th day of May, A. D., 1914.

[SEAL.]                                       R. F. WHITEHEAD,

*Acting Commissioner of Patents.*